Feb. 7, 1933.  A. C. TEGTMEYER  1,896,566
WEED TURNER FOR PLOWS
Filed Oct. 27, 1931
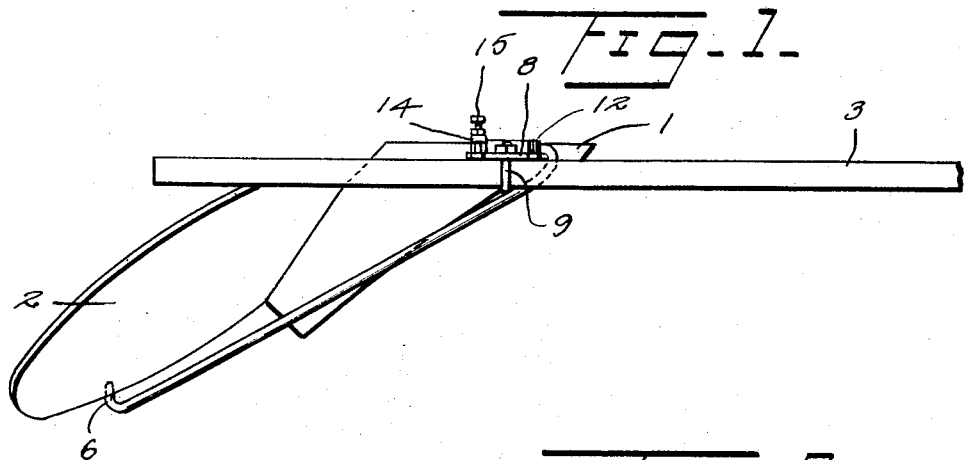
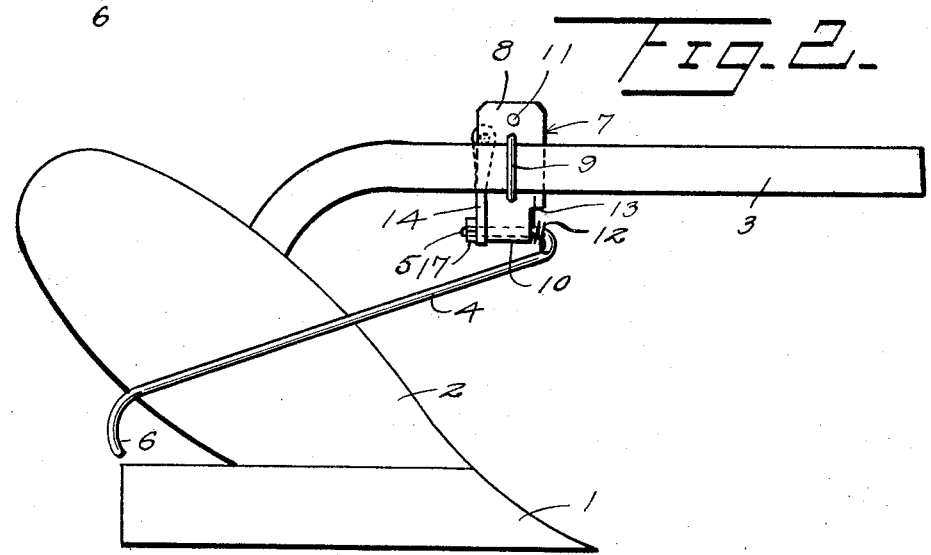
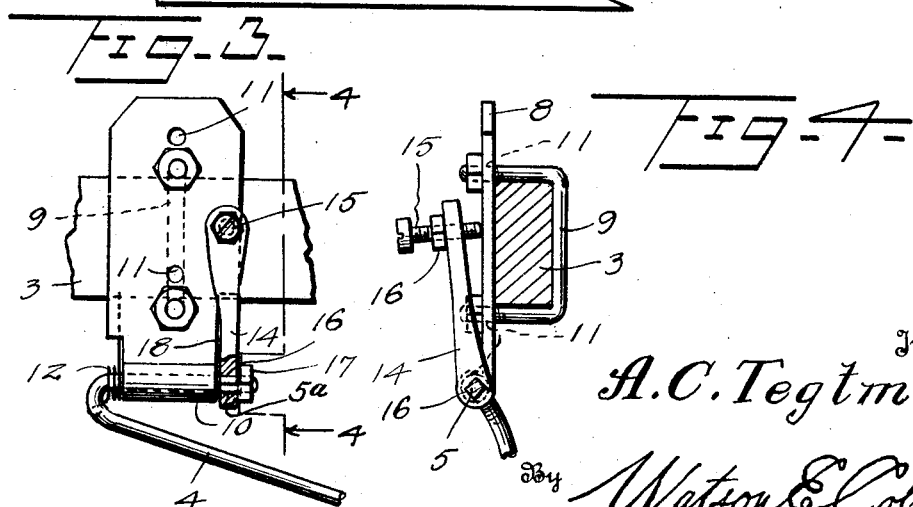
Inventor
A. C. Tegtmeyer
By Watson E. Coleman
Attorney Patented Feb. 7, 1933

1,896,566

UNITED STATES PATENT OFFICE

AUGUST C. TEGTMEYER, OF NEBRASKA CITY, NEBRASKA

WEED TURNER FOR PLOWS

Application filed October 27, 1931. Serial No. 571,423.

This invention relates to weed turners for plows, and has for one of its objects to provide a novel device of this character which will embody a bar adapted to be mounted on the plow in a downwardly and rearwardly inclined position across the face of the moldboard of the plow, and a hook extending downwardly and inwardly from the rear end of the bar into the furrow formed by the soil turned over by the plow, to the end that sweet clover, sunflowers and the like trash may be turned under the soil for complete burying beneath the same.

The invention has for a further object to provide a weed turner of the character stated which will also embody novel means for connecting the bar to the beam of the plow, such means comprising a bracket adapted to be secured to the beam, a journal carried by the bar and connecting it to the bracket for swinging movement toward and away from the moldboard, a spring bearing against the bracket and bar and constantly urging the bar in the direction of the moldboard to effect the burying of the trash beneath the turned over soil, and means carried by the journal and cooperating with the bracket to limit the swinging movement of the bar away from the moldboard.

The invention has for a further object to provide a weed turner of the character stated wherein the means for limiting the swinging movement of the bar away from the moldboard will be adjustable to the end that the distance that the bar may be swung away from the moldboard may be varied as the nature of the trash to be turned under may require.

With the foregoing and other objects in view, the nature of which will appear as the description proceeds, the invention consists in the construction, combination and arrangement of parts hereinafter fully described and claimed, and illustrated in the accompanying drawing, wherein:—

Figure 1 is a top plan view of a plow equipped with a weed turner constructed in accordance with my invention;

Figure 2 is a view in side elevation of the plow and weed turner;

Figure 3 is an elevational view illustrating on an enlarged scale the means for connecting the weed turner bar to the plow beam and the means for regulating the swinging movement of the turner bar, and Figure 4 is a sectional view taken on the plane indicated by the line 4—4 of Figure 3.

Referring in detail to the drawing, 1 designates the share, 2 the moldboard and 3 the beam of a turning plow.

The weed turner comprises a straight bar 4 provided at one end with a journal 5 and at its other end with a hook 6. The bar 4 is supported by its journal 5 in a downwardly and rearwardly inclined position across the face of the moldboard 2. The bar 4 is greater in length than the width of the moldboard and extends forwardly and rearwardly beyond the same. The hook 6 which is carried by the rear end of the bar 4, and which is located rearwardly of the rear edge of the moldboard 2, extends downwardly and inwardly from the bar so as to be arranged in the furrow formed by the soil turned over by the moldboard. The journal 5 extends rearwardly from the upper end of the bar 4 and serves to connect the bar to a bracket 7 fixed to the beam 3.

The bracket 7 comprises a plate 8 which is arranged in upright position against that lateral side of the beam 3 remote from the share 2 and which is secured to the beam by a U-bolt 9. The plate 8 is greater in length than the width of the beam 3 and extends above and below the beam, and it is provided at its lower end with a bearing sleeve 10 for the reception of the journal 5 so as to support the rod 4 for swinging movement toward and away from the moldboard 2. The plate 8 is provided with a vertical series of openings 11 through a selective pair of which the ends of the bolt 9 pass. As the plate 8 is provided with more than two openings 11 it may be secured to the beam 3 in position to support the rod 4 at the height necessary to arrange the hook 6 in the furrow. A coil spring 12 sleeved on the journal 5 between the front end of the rod 4 and the corresponding end of the bearing sleeve 10, and bearing at one end against the plate 8 and at the other end against the rod, serves to constantly urge the rod 4 in the direction of the moldboard 2.

The lower front corner of the plate 8 is cut away or notched, as shown at 13, to permit the application of the spring 12 to the journal 5 and to permit one end of the spring to be arranged in contact with the plate 8. An arm 14 fixed to and extending upwardly from the journal 5, and a set screw 15 passing through the upper end of the arm and contacting with the outer sides of the plate 8, serve to limit the outward swinging movement of the rod 4 with relation to the moldboard 2. The set screw 15 may be adjusted on the arm 14 to vary this swinging movement of the rod 4, and it is secured in adjusted position by a lock nut 16 carried thereby and contacting with the arm. The journal 5 is provided with a squared portion 5a which passes through a correspondingly formed opening 16 in the lower end of the arm 14 to hold the arm against turning movement with relation to the journal. The lower end of the arm 14 is located between the rear end of the bearing sleeve 10 and a nut 17 mounted on the rear end of the journal 5 and serving to hold the arm on the journal in the bearing sleeve. The lower rear corner of the plate 8 is cut away, as shown at 18, for the reception of the lower portion of the arm 14 to the end that the upper portion may be positioned directly opposite the outer face of the plate 8 and thus enable the set screw 15 to contact with the plate.

In practice, the bar 4 will, in view of its downwardly and rearwardly inclined position with relation to the face of the moldboard 2, contact with and ride along the free edge of the soil turned over by the moldboard, and the hook 6 will, as it extends downwardly and inwardly from the lower end of the bar, ride in the furrow formed by the turned over soil, with the result that sweet clover, sunflowers and other trash will be turned under the soil and be completely buried by the same. As the spring 12 constantly urges the bar 4 in the direction of the moldboard 2, the bar and hook 6 will at all times be held in position to turn the trash under the soil. The tendency of the turned over soil is to swing the bar 4 upwardly and away from the moldboard 2 and against the tension of the spring 12. The set screw 15 is adjustable on the arm 14, and downward movement of the bar 4 may be regulated and controlled thereby as conditions may require so as to insure the turning of the trash under the soil.

While I have described the principle of the invention, together with the structure which I now consider the preferred embodiment thereof, it is to be understood that the structure shown is merely illustrative and that such changes may be made, when desired, as fall within the scope of the invention as claimed.

What is claimed is:—

1. In combination, the beam and moldboard of a plow, a bracket secured to the beam, a weed turning bar extending downwardly and rearwardly across the face of the moldboard and provided at its rear end with a hook extending downwardly and inwardly therefrom, means connecting the bar to the bracket for swinging movement towards and away from the moldboard, a spring constantly urging the bar in the direction of the moldboard, an arm connected to the bar, and a set screw carried by the arm, said arm and said set screw constituting adjustable means cooperating with the bracket to limit the movement of the bar in a direction toward the moldboard.

2. In combination, the beam and moldboard of a plow, a bracket secured to the beam, a weed turning bar extending downwardly and rearwardly across the face of the moldboard and provided at its rear end with a hook extending downwardly and inwardly therefrom, a journal carried by the bar and mounted in the bracket to support the bar for swinging movement towards and away from the moldboard, a coil spring sleeved on the journal with one end in contact with the bracket and the other in contact with the bar and serving to constantly urge the bar in the direction of the moldboard, an arm secured to the journal, and a set screw secured to the arm, said arm and set screw constituting adjustable means cooperating with the bracket to limit the swinging movement of the bar in a direction toward the moldboard.

3. In combination, the beam and moldboard of a plow, a bracket secured to the beam and provided with a bearing sleeve, a journal extending through the bearing sleeve, a weed turning bar extending downwardly and rearwardly from the journal across the face of the moldboard and provided at its rear end with a hook extending downwardly and inwardly therefrom, the journal connecting the bar to the bracket for swinging movement toward and away from the moldboard, a coil spring sleeved on the journal and bearing against the bracket and bar to constantly urge the latter in the direction of the moldboard, the bar being located at one side of the bracket, an arm secured to the journal and located at the opposite side of the bracket, and a set screw carried by the arm and contacting with said last side of the bracket, the arm and set screw constituting adjustable means serving to limit the movement of the bar in a direction toward the moldboard.

In testimony whereof I hereunto affix my signature.

AUGUST C. TEGTMEYER.